ing on the pipe and their distance apart one from the other, the mechanism cannot be readily shifted out of its correct predetermined position, as has heretofore been possible in devices of this kind where long rollers extending along the pipe are made use of. When the chain 46 carrying the wheels 50 is adjusted in cutting position, as
UNITED STATES PATENT OFFICE.

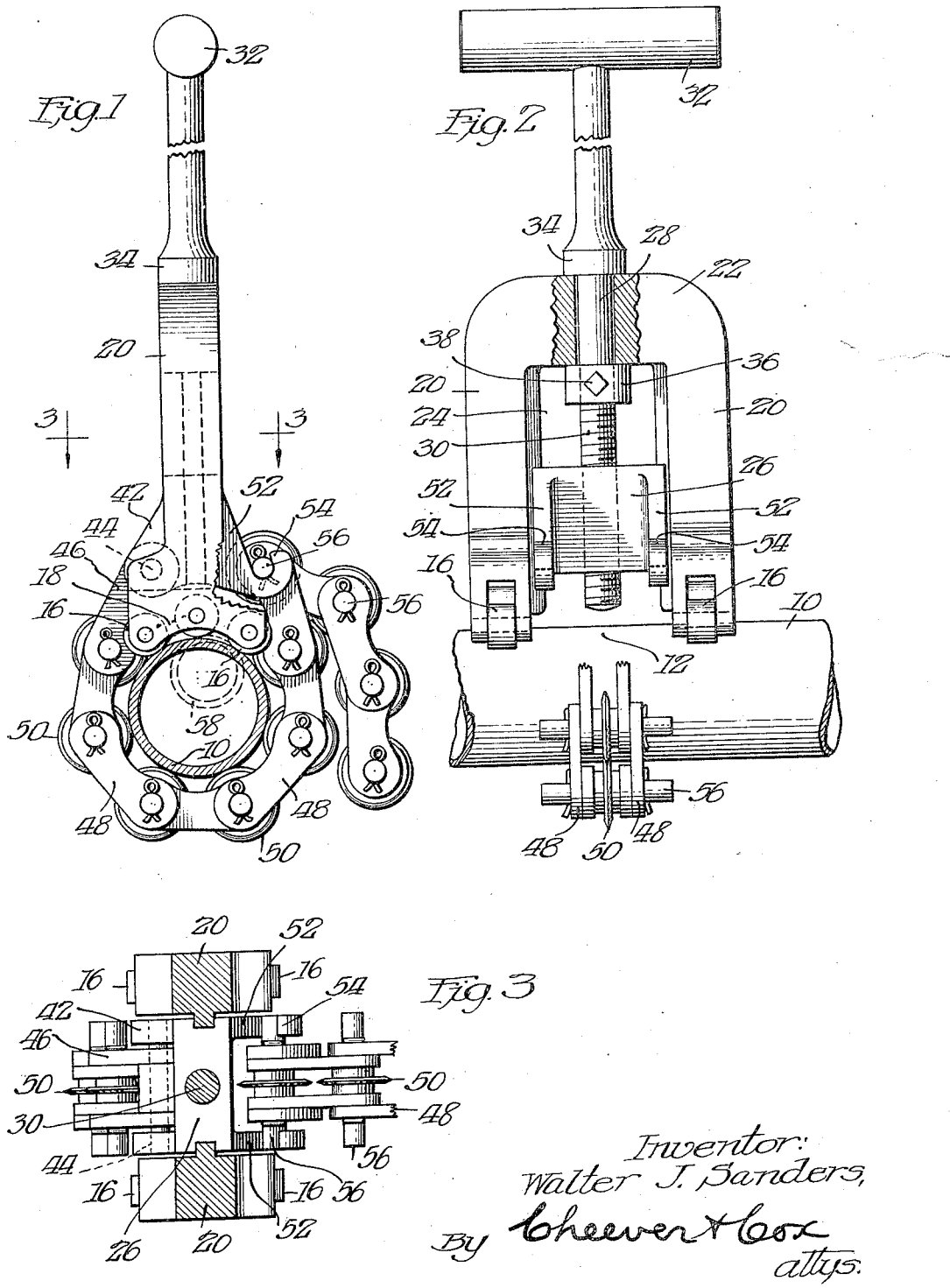

WALTER J. SANDERS, OF CHICAGO, ILLINOIS, ASSIGNOR OF ONE-HALF TO JOHN H. SANDERS, OF CHICAGO, ILLINOIS.

PIPE CUTTER.

1,402,968.  Specification of Letters Patent.  Patented Jan. 10, 1922.

Application filed July 22, 1921. Serial No. 486,846.

*To all whom it may concern:*

Be it known that I, WALTER J. SANDERS, a citizen of the United States, residing at Chicago, in the county of Cook and State of Illinois, have invented a certain new and useful Improvement in Pipe Cutters, of which the following is a specification.

This invention relates to pipe cutters. The object of the invention is to provide such a device of the type in which chain carrying cutting wheels are caused to travel around the pipe to be cut, of such a construction that the cutting wheels are forced to travel round and round the pipe in a true circle at right angles to the axis of the pipe instead of traveling in a screw thread path with resulting non-cutting, as is the case with other devices well known in the art.

The invention consists in means for attaining the foregoing objects which can be easily and cheaply made, which is satisfactory in use and is not liable to get out of order. More particularly the invention consists in special features and details of construction hereafter more fully set forth in the specification and claims.

Referring to the drawings in which like numerals designate the same parts throughout the several views, Figure 1 is a side view of a cutter illustrating this invention, taken transversely of a pipe which is being cut.

Figure 2 is a face view of the cutter taken at the side of the pipe.

Figure 3 is a plan view, partially in section, on the line 3—3, Figure 1.

The mechanism of this invention is supported on the pipe 10 to be cut on opposite sides of the line of cut 12 by two sets of comparatively wide separated wheels 16, each set comprising, by preference, three or more wheels arranged in the same plane, at right angles to the axis of the pipe 10, pivoted in the arc of a circle 18 extending around the pipe. These sets of wheels support opposite side legs 20 of the U-shaped frame member 22 with its peripheral plane in the axis of the pipe to be cut. Between legs 20 of the U-shaped member 22 is an open space 24 adapted to receive and permit the reciprocation to and from pipe 10 of crosshead 26, connected by screw threads 30 to a shaft 28, suitably journaled in the frame member 22 and rotatable by handle 32 of obvious construction. The journal bearing for the shaft includes a conventional enlarged portion 34 on the shaft proper bearing on the upper end of the frame member 22 and the collar 36 held in place by a nut 38. When the operator rotates handle 32, he reciprocates crosshead 26 to and from the pipe 10. On one side of the crosshead 26 there are suitable lugs 42 carrying the pivot pin 44, to which is attached more or less permanently the end link 46 of a chain 48 carrying the pipe cutting wheels 50 of conventional construction, adapted to cut line 12 about the pipe.

On the opposite side of the crosshead 26 from the lugs 42 are other parallel lugs 52 having in them notches 54 adapted to receive a selected one of the wheel shafts 56 which carry the wheels 50 from the chain links 48. The operator can, therefore, depending on the size of the pipe 10, hook a selected one of these shafts 56 into the notches 54, as shown in Figure 1 and thereafter by properly manipulating handle 32, tighten the chain 48 about the pipe to cause one or more of the rollers 50 to operatively engage the pipe to cut it.

By the use of the U-shaped frame 22 and the intervening cross head 26 certain wheels 50 on chain 48 pass, partially at least, between the rows of rollers 16 to cut pipe at that point. This gives a more complete distribution of wheels 50 around the pipe whereby a piece of pipe may be completely severed by rocking cross head 20 through a comparatively short arc. This is very important in close quarter work as in the corner of a room.

In the preferred form of construction shown in full lines of the drawing, there are preferably three wheels 16, as the case may be, in each set which bear and travel upon the circumference of the pipe 10 and they are as shown each comparatively small and located a substantial distance from the line of cut 12 so that they each, independently forcibly engage the surface of the pipe to practically automatically position the device on the pipe with the axes of the wheels 16 parallel to the axis of the pipe 10. Because of the large number of small wheels so bearing on the pipe and their distance apart one from the other, the mechanism cannot be readily shifted out of its correct predetermined position, as has heretofore been possible in devices of this kind where long rollers extending along the pipe are made use of. When the chain 46 carrying the wheels 50 is adjusted in cutting position, as shown in Figure 1, and the operator takes hold of the handle 32 and starts to rotate the entire device about the pipe 10 all of the sets of small wheels mentioned, viz., 16 and 50, have to travel in arcs of circles whose planes are at right angles to the axis of the pipe 10, and the line of cut 12 must therefore be a circle at right angles to the axis of the pipe.

When, however, it is necessary to cut another pipe, as that shown in dotted lines 58, Figure 1, of a size which the special machine in hand is not designed for, the device is still operative thereon by virtue of the fact that only two of the wheels 16 of each set still travel on the circumference of the pipe as before to hold the frame in place.

Having thus described my invention, what I claim as new and desire to secure by Letters Patent, is:

1. In mechanism of the class described, a U-shaped frame member having oppositely disposed side members, lying in a plane through the axis of the pipe to be cut, a plurality of wheels on the end of each such side members adapted to travel in the arc of a circle about a pipe to be cut, a crosshead reciprocable in the U-shaped member, a pipe cutting chain connected to the crosshead between said pluralities of wheels passing around the pipe, means for moving the crosshead to tighten the chain, and means for moving the U-shaped member and all parts carried thereby about the pipe, for the purposes set forth.

2. In mechanism of the class described, a plurality of supporting wheels in alignment with each other in a plane transverse to the axis of a pipe to be cut and adapted to travel around the circumference of such a pipe, another similar set of wheels parallel thereto, a U-shaped body member having two arms, lying in the plane of the axis of the pipe to be cut one of which affords journal support for each of said sets of wheels, a crosshead intermediate of said sets of wheels reciprocatable with reference to the body member, means to so reciprocate the crosshead, a chain carrying pipe cutting member, attached to the crosshead and embracing the pipe to be cut, intermediate of the first sets of wheels, all of the parts being arranged and disposed as shown and described, for the purposes set forth.

In witness whereof, I have hereunto subscribed my name in the presence of two witnesses.

WALTER J. SANDERS.

Witnesses:
VELMA GRIFFITH,
CHARLES M. PRICE.